(12) United States Patent
Kanahara et al.

(10) Patent No.: US 9,000,622 B2
(45) Date of Patent: Apr. 7, 2015

(54) VEHICULAR POWER TRANSMISSION DEVICE

(71) Applicant: Honda Motor Co., Ltd., Tokyo (JP)

(72) Inventors: Hirokazu Kanahara, Haga-gun (JP); Shinichi Arie, Haga-gun (JP); Yoshihiro Mishio, Haga-gun (JP); Katsumi Kanasugi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 13/932,282

(22) Filed: Jul. 1, 2013

(65) Prior Publication Data

US 2014/0008969 A1 Jan. 9, 2014

(30) Foreign Application Priority Data

Jul. 4, 2012 (JP) ................... 2012-150535

(51) Int. Cl.
| | |
|---|---|
| *H02J 17/00* | (2006.01) |
| *B60L 11/18* | (2006.01) |
| *H02J 7/02* | (2006.01) |
| *H04B 15/04* | (2006.01) |

(52) U.S. Cl.
CPC ............... *H02J 17/00* (2013.01); *B60L 11/182* (2013.01); *Y02T 10/7005* (2013.01); *Y02T 90/14* (2013.01); *Y02T 90/122* (2013.01); *H02J 7/025* (2013.01); *H04B 15/04* (2013.01)

(58) Field of Classification Search
CPC ....................................................... H02J 17/00
USPC .................................................. 307/9.1, 104
See application file for complete search history.

(56) References Cited

U.S. PATENT DOCUMENTS

| | | | |
|---|---|---|---|
| 2005/0007067 A1 | 1/2005 | Baarman et al. | |
| 2006/0274493 A1* | 12/2006 | Richardson et al. | 361/683 |
| 2009/0045772 A1* | 2/2009 | Cook et al. | 320/108 |

(Continued)

FOREIGN PATENT DOCUMENTS

| | | |
|---|---|---|
| CN | 102315692 | 1/2012 |
| EP | 1962402 A2 | 8/2008 |

(Continued)

OTHER PUBLICATIONS

Chinese Office Action for Application No. 201310257737.7 dated Jun. 19, 2014; English translation included.

(Continued)

*Primary Examiner* — Daniel Cavallari
(74) *Attorney, Agent, or Firm* — Rankin, Hill & Clark LLP

(57) ABSTRACT

A vehicular power transmission device includes a power transmission unit which transmits electromagnetic waves to a mobile device to transmit power to a power reception unit of the mobile device, and a frequency changing unit which, when it is determined based on the transmission frequency of the electromagnetic waves to be transmitted from the power transmission unit to the mobile device and a reception frequency of a radio receiver that radio noise is generated by the power transmission unit, changes the transmission frequency of the electromagnetic waves of the power transmission unit, wherein the power transmission unit changes a transmission power of the electromagnetic waves based on an amount of change in the transmission frequency of the electromagnetic waves changed by the frequency changing unit.

6 Claims, 3 Drawing Sheets

(56) References Cited

U.S. PATENT DOCUMENTS

| | | |
|---|---|---|
| 2009/0284082 A1 | 11/2009 | Mohammadian |
| 2011/0031928 A1* | 2/2011 | Soar .............................. 320/108 |
| 2013/0005251 A1* | 1/2013 | Soar .............................. 455/41.1 |
| 2013/0038279 A1* | 2/2013 | Seyerle et al. ................. 320/108 |
| 2014/0312686 A1* | 10/2014 | Shraga et al. ................. 307/10.1 |

FOREIGN PATENT DOCUMENTS

| | | |
|---|---|---|
| JP | 59-144231 | 8/1984 |
| JP | 11-168837 | 6/1999 |
| JP | 2002-290261 | 10/2002 |
| JP | 3688437 | 6/2005 |
| JP | 2007-269261 | 10/2007 |
| JP | 2008-206297 | 9/2008 |
| WO | 2011/077225 A2 | 6/2011 |
| WO | 2011/156768 A2 | 12/2011 |

OTHER PUBLICATIONS

European Search Report dated Jul. 31, 2014, Application No. 13173929.4. eight pages.

Japan Notice of Allowance for Application No. 2012-150535; Mailing Date: Feb. 25, 2014

* cited by examiner

VEHICULAR POWER TRANSMISSION DEVICE

CROSS-REFERENCE TO RELATED APPLICATION

Priority is claimed on Japanese Patent Application No. 2012-150535, filed on Jul. 4, 2012, the content of which is incorporated herein by reference.

BACKGROUND OF THE INVENTION

1. Field of the Invention

The present invention relates to a vehicular power transmission device.

2. Description of Related Art

In the related art, a control device in which, when driving and controlling an electric motor of an electrically driven power steering device of a vehicle by a pulse width modulation (PWM) control signal, the driving frequency of the electric motor is changed based on a signal output from a radio receiver is known (for example, see Japanese Patent No. 3688437).

SUMMARY OF THE INVENTION

On the other hand, for example, when a control operation by the control device of the related art is applied to a wireless power transmission technique which transmits power in a noncontact manner by transmission of electromagnetic waves, the transmission frequency of the electromagnetic waves is changed based on the signal output from the radio receiver.

However, only when the transmission frequency of electromagnetic waves on a power transmission side (power transmission mechanism) is changed, reception power on a reception side (power reception mechanism) may be lowered due to mismatching (that is, deviation between resonance points) between the transmission frequency and the reception frequency on the reception side (power reception mechanism).

The aspect of the invention has been accomplished in consideration of the above-described situation, and an object of the aspect of the invention is to provide a vehicular power transmission device which is capable of preventing lowering of transmission power while eliminating noise mixing in a radio receiver when transmitting power in a noncontact manner through transmission of electromagnetic waves.

In order to solve the above-described problem and to attain the relevant object, a vehicular power transmission device according to the invention introduces the following configuration.

(1) A vehicular power transmission device according to an aspect of the invention includes a power transmission unit which is provided in a vehicle and transmits electromagnetic waves to a mobile device to transmit power to a power reception unit of the mobile device, and a frequency changing unit which, when it is determined based on a transmission frequency of the electromagnetic waves to be transmitted from the power transmission unit to the mobile device and a reception frequency of a radio receiver that radio noise is caused by the power transmission unit, changes the transmission frequency of the electromagnetic waves of the power transmission unit, wherein the power transmission unit changes a transmission power of the electromagnetic waves based on an amount of change in the transmission frequency of the electromagnetic waves changed by the frequency changing unit.

(2) In the aspect of (1), the power transmission unit may increase the transmission power of the electromagnetic waves in accordance with the amount of change in the transmission frequency of the electromagnetic waves changed by the frequency changing unit.

(3) In the aspect of (2), the power transmission unit may store information regarding a transmission characteristic according to the transmission frequency of the electromagnetic waves in advance, and may increase the transmission power of the electromagnetic waves so as to make reception power received by the power reception unit substantially equal before and after the change of the transmission frequency of the electromagnetic waves based on the information regarding the transmission characteristic and the amount of change in the transmission frequency of the electromagnetic waves.

(4) In the aspects of (1) to (3), the vehicular power transmission device may further include an acquisition unit which acquires a reception power of the electromagnetic waves to be received by the mobile device, in which the power transmission unit may change the transmission power of the electromagnetic waves based on the reception power of the electromagnetic waves acquired by the acquisition unit.

According to the aspect of (1), it is possible to eliminate noise mixing in the radio receiver due to power transmission while preventing lowering of reception power received by the power reception unit of the mobile device due to change in the transmission frequency of the electromagnetic waves.

According to the aspect of (2), it is possible to compensate for lowering of reception power received by the power reception unit due to mismatching between the transmission frequency and the reception frequency of the power transmission unit and the power reception unit of the mobile device with an increase in transmission power according to the amount of change in the transmission frequency.

According to the aspect of (3), it is possible to increase the transmission power so as to make the reception power substantially equal before and after the change of the transmission frequency based on the information (for example, information regarding the correspondence relationship between the transmission frequency and the transmission power, or the like) regarding the transmission characteristic according to the transmission frequency of the electromagnetic waves.

According to the aspect of (4), the transmission power is changed based on the reception power acquired by the acquisition unit. For this reason, it is possible to appropriately prevent lowering of the reception power received by the power reception unit due to change in the transmission frequency.

DESCRIPTION OF EMBODIMENTS

Hereinafter, a vehicular power transmission device according to an embodiment of the invention will be described with reference to the accompanying drawings.

The vehicular power transmission device 10 of this embodiment is provided in an in-vehicle device 1 which is mounted in a vehicle, and eliminates noise mixing in a radio receiver 3 when transmitting power to a mobile device 2 which is carried with a passenger of the vehicle.

Figure 1:
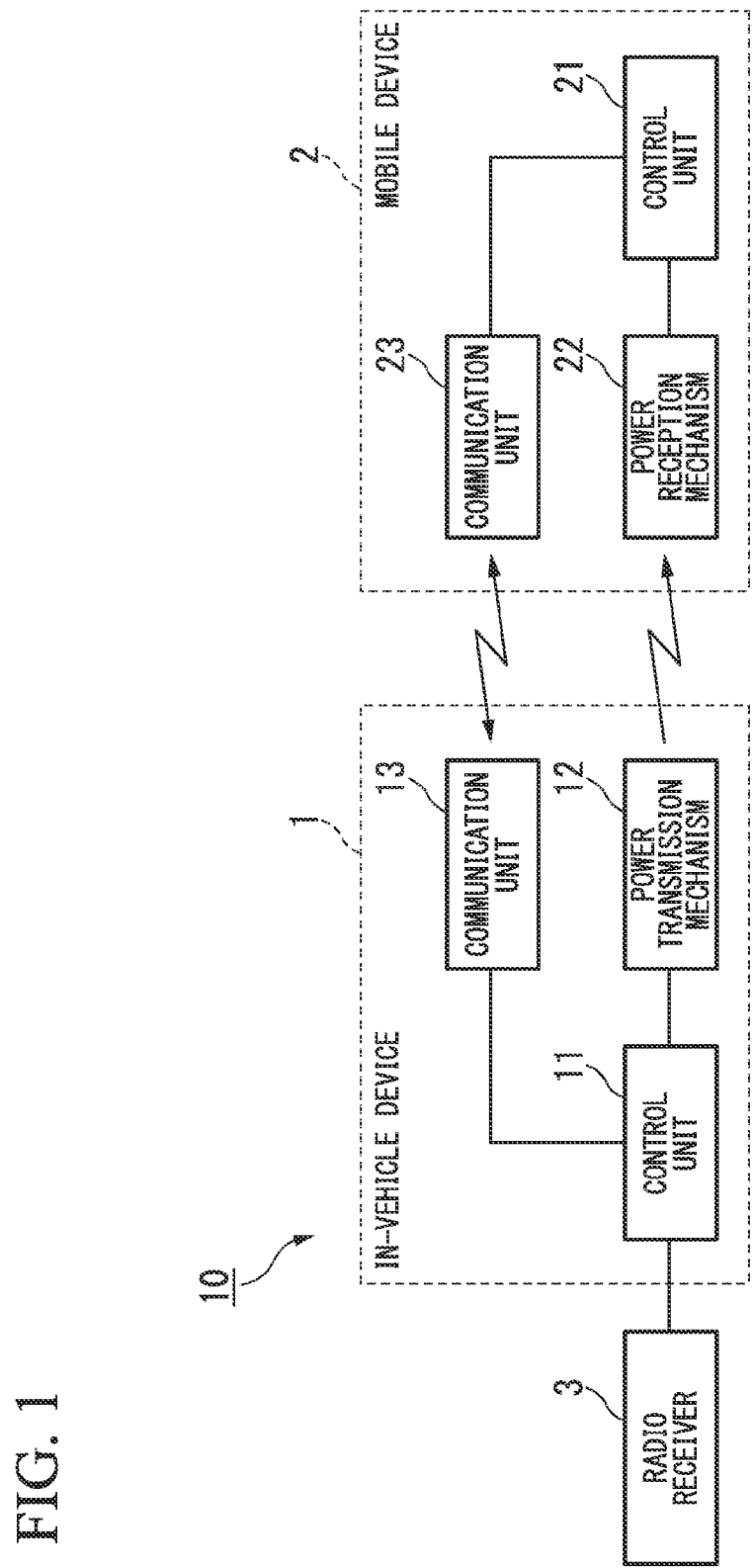
FIG. 1 is a configuration diagram of a vehicular power transmission device according to an embodiment of the invention.

For example, as shown in FIG. 1, a vehicular power transmission device 10 includes a control unit 11 (frequency changing unit), a power transmission mechanism 12 (power transmission unit), and a communication unit 13.

For example, the vehicular power transmission device 10 can perform wireless communication with the mobile device 2 and is communicably connected to the radio receiver 3 in a wired manner.

For example, the control unit 11 can acquire the reception frequency (radio frequency) of the radio receiver 3 through communication with the radio receiver 3, and outputs a command signal which instructs the operations of the power transmission mechanism 12 and the communication unit 13.

For example, the control unit 11 instructs the power transmission mechanism 12 to transmit electromagnetic waves having a transmission frequency within a predetermined allowable frequency range set in advance to the mobile device 2. For example, the predetermined allowable frequency range is set in accordance with the characteristics of the mobile device 2 and the power transmission mechanism 12.

For example, the control unit 11 determines whether or not radio noise is generated in the radio receiver 3 by power transmission of the power transmission mechanism 12 based on the transmission frequency of the electromagnetic waves to be transmitted from the power transmission mechanism 12 to the mobile device 2 and the radio frequency acquired from the radio receiver 3.

Specifically, for example, the control unit 11 determines whether or not the difference between the radio frequency and a multiplied wave nearest the radio frequency from among multiplied waves of the transmission frequency of the electromagnetic waves to be transmitted from the power transmission mechanism 12 is equal to or smaller than a predetermined threshold value.

When the difference is equal to or smaller than the predetermined threshold value, it is determined that radio noise is generated in the radio receiver 3 by power transmission of the power transmission mechanism 12.

When the difference is greater than the predetermined threshold value, it is determined that radio noise is not generated in the radio receiver 3 by power transmission of the power transmission mechanism 12.

For example, when it is determined that radio noise is generated in the radio receiver 3 by power transmission of the power transmission mechanism 12, the control unit 11 instructs the power transmission mechanism 12 to change the transmission frequency of the electromagnetic waves to be transmitted from the power transmission mechanism 12 to the mobile device 2.

For example, the control unit 11 instructs the power transmission mechanism 12 to increase the transmission power of the electromagnetic waves so as to make the reception power by the mobile device 2 substantially equal before and after the change of the transmission frequency in accordance with the amount of change in the transmission frequency of the electromagnetic waves.

For example, the power transmission mechanism 12 transmits electromagnetic waves of microwaves converted from a current by an antenna (not shown) under the control of the control unit 11, and the electromagnetic waves are received by an antenna (not shown) of the mobile device 2 and converted to a current. Thus, power is transmitted.

For example, the power transmission mechanism 12 stores information regarding a transmission characteristic according to the transmission frequency of the electromagnetic waves in advance. For example, as shown in FIG. 2(A), the information regarding the transmission characteristic is information which represents change in power density having a maximum value at a frequency f0 of a predetermined resonance point of the power transmission mechanism 12 and changing on a downward trend as away from the resonance point, or the like.

For example, the power transmission mechanism 12 changes the transmission frequency of the electromagnetic waves under the control of the control unit 11, and increases the transmission power of the electromagnetic waves in accordance with the amount of change in the transmission frequency. The power transmission mechanism 12 performs setting so as to make the reception power by the mobile device 2 substantially equal before and after the change of the transmission frequency based on the information regarding the transmission characteristic stored in advance.

Figure 2:
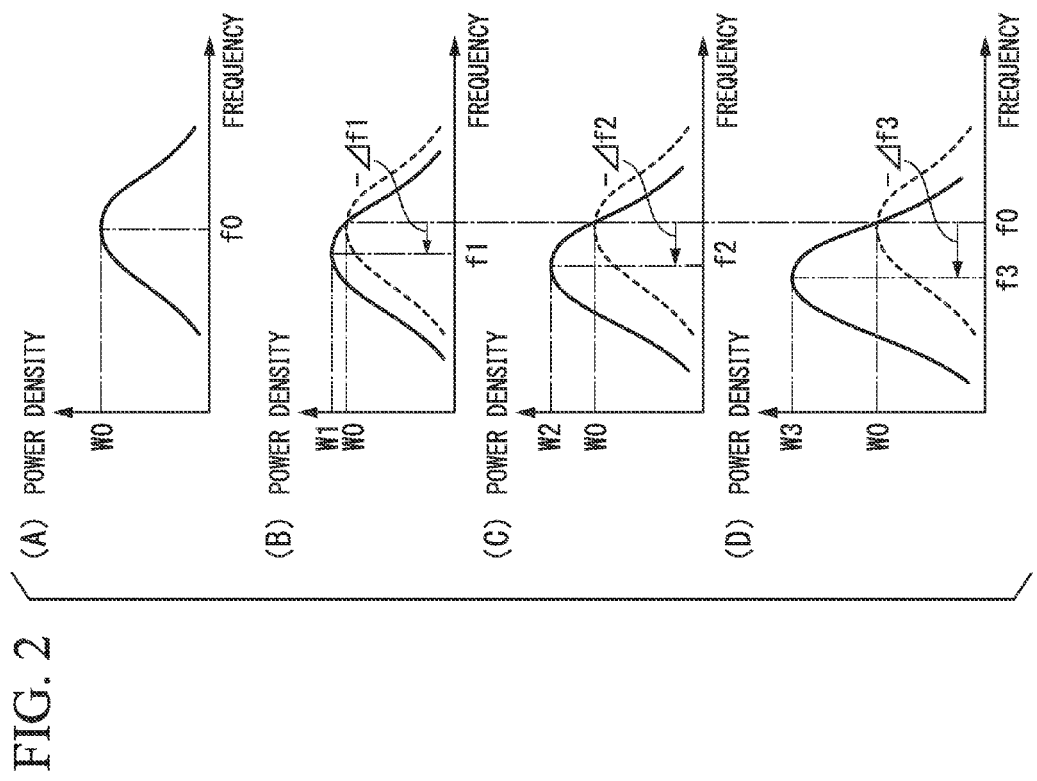
FIG. 2 is a graph showing an example of the correspondence relationship between the transmission frequency of electromagnetic waves to be transmitted from a vehicular power transmission device according to an embodiment of the invention and power density of transmission power.

For example, as shown in FIGS. 2(B) to 2(D), when the transmission frequency sequentially decreases from the frequency f0 of the predetermined resonance point of the power transmission mechanism 12 to first to third frequencies f1, f2, and f3 (f0>f1>f2>f3), the power densities W1, W2, and W3 (W0<W1<W2<W3) at the respective transmission frequencies are set on an upward trend in accordance with the amounts $-\Delta f1$, $-\Delta f2$, and $-\Delta f3$ ($-\Delta f1 > -\Delta f2 > -\Delta f3$) of change in the transmission frequency such that the power density at the predetermined frequency f0 is maintained at a predetermined value W0.

For example, as shown in FIGS. 2(E) to 2(G), when the transmission frequency sequentially increases from the frequency f0 of the predetermined resonance point of the power transmission mechanism 12 to fourth to sixth frequencies f4, f5, and f6 (f0<f4<f5<f6), the power densities W4, W5, and W6 (W0<W4<W5<W6) at the respective transmission frequencies are set on an upward trend in accordance with the amounts $+\Delta f4$, $+\Delta f5$, and $+\Delta f6$ ($+\Delta f4 < +\Delta f5 < +\Delta f6$) of change in the transmission frequency such that the power density at the predetermined frequency f0 is maintained at the predetermined value W0.

For example, the communication unit 13 is capable to perform wireless communication with the mobile device 2, and performs transmission and reception of various kinds of information.

The mobile device 2 is capable to perform wireless communication with the vehicular power transmission device 10 and is capable to feed power in a noncontact manner by the vehicular power transmission device 10. For example, the mobile device 2 includes a control unit 21, a power reception mechanism 22 (power reception unit), and a communication unit 23.

The control unit 21 outputs a command signal which instructs the operations of the power reception mechanism 22 and the communication unit 23.

For example, the power reception mechanism 22 converts microwaves received by the antenna (not shown) under the control of the control unit 21 into current due to acquire power.

For example, the communication unit 23 is capable to perform wireless communication with the mobile device 2, and performs transmission and reception of various kinds of information.

The vehicular power transmission device 10 of this embodiment has the above-described configuration. Next, the operation of the vehicular power transmission device 10, in particular, processing for setting a transmission frequency will be described.

Figure 3:
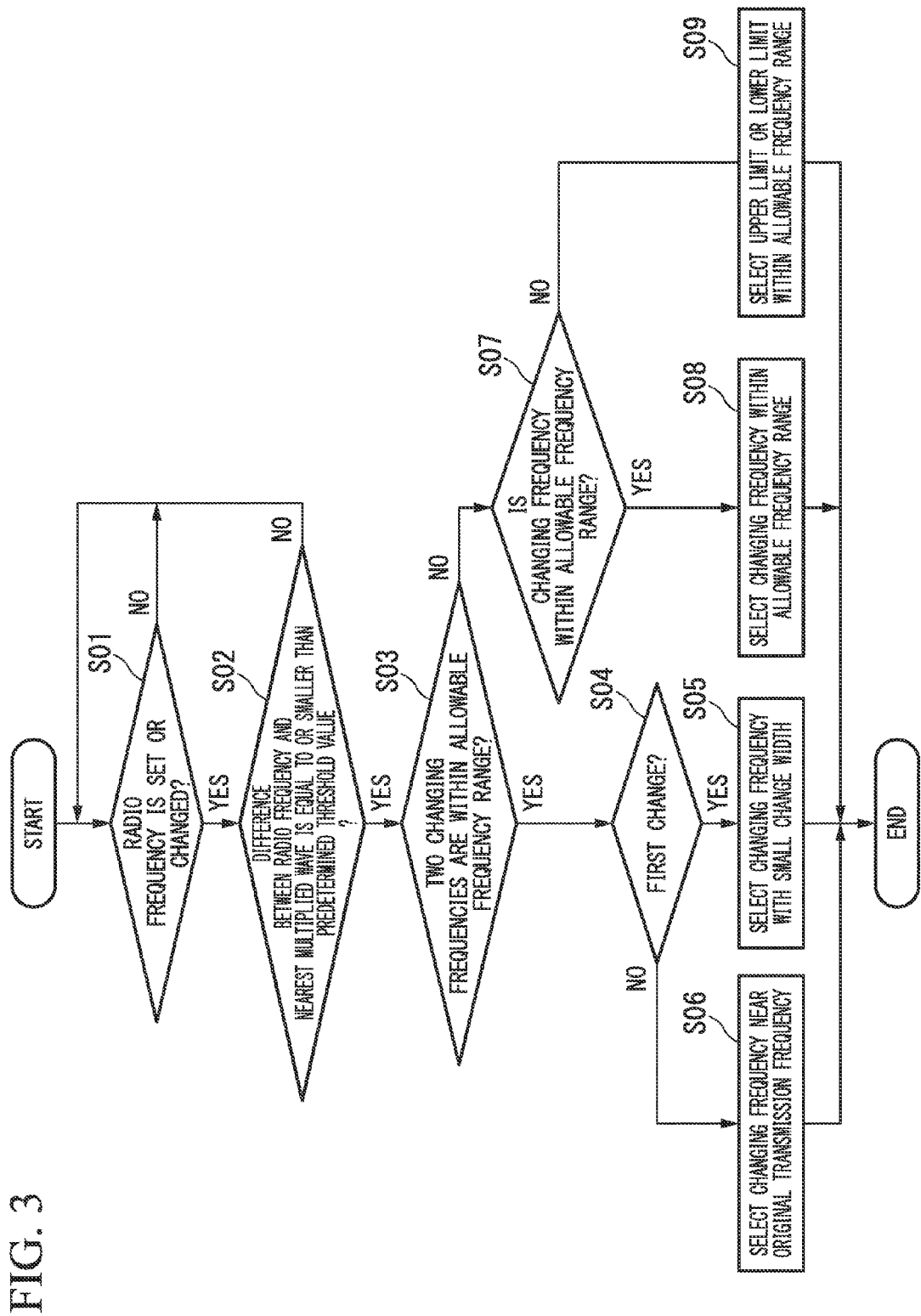
FIG. 3 is a flowchart showing the operation of a vehicular power transmission device according to an embodiment of the invention.

First, for example, in Step S01 shown in FIG. 3, it is determined whether or not the radio frequency is set or changed.

When the determination result is "NO", the determination processing of Step S01 is repeatedly executed.

When the determination result is "YES", the process progresses to Step S02.

For example, the setting of the radio frequency is executed at the time of the start of the vehicle or at the time of power-on of the radio receiver 3 during driving.

For example, the changing of the radio frequency is executed by an operation to change a frequency by an operator or with automatic search of a receivable frequency.

Next, in Step S02, it is determined whether or not the difference between the radio frequency and a multiplied wave nearest the radio frequency from among multiplied waves of the transmission frequency of the electromagnetic waves to be transmitted from the power transmission mechanism 12 is equal to or smaller than a predetermined threshold value.

When the determination result is "NO", the process returns to Step S01 described above.

When the determination result is "YES", the process progresses to Step S03.

Next, in Step S03, it is determined whether or not two upward and downward changing frequencies not near the divisor of the radio frequency are within a predetermined allowable frequency range as the transmission frequency of the electromagnetic waves to be transmitted from the power transmission mechanism 12.

When the determination result is "NO", the process progresses to Step S07 described below.

When the determination result is "YES", the process progresses to Step S04.

In Step S04, it is determined whether or not a current change instruction is a first change instruction.

When the determination result is "NO", the process progresses to Step S06 described below.

When the determination result is "YES", the process progresses to Step S05.

In Step S05, of the two upward and downward changing frequencies, the changing frequency with a small change width is selected. Then, the transmission power is increased in accordance with the amount of change in the transmission frequency so as to make the reception power by the mobile device 2 substantially equal before and after the change, and the process ends.

When the two upward and downward changing frequencies have the same change width, either is selected arbitrarily (randomly).

In Step S06, of the two upward and downward changing frequencies, a changing frequency near the original transmission frequency is selected. Then, the transmission power is increased in accordance with the amount of change in the transmission frequency so as to make the reception power by the mobile device 2 substantially equal before and after the change, and the process ends.

In Step S07, it is determined whether or not the upward or downward changing frequency is within the predetermined allowable frequency range.

When the determination result is "NO", the process progresses to Step S09.

When the determination result is "YES", the process progresses to Step S08.

In Step S08, of the two upward and downward changing frequencies, a changing frequency which is within the predetermined allowable frequency range is selected.

Then, the transmission power is increased in accordance with the amount of change in the transmission frequency so as to make the reception power by the mobile device 2 substantially equal before and after the change, and the process ends.

In Step S09, of the upper limit and the lower limit of the predetermined allowable frequency range, one having a large difference between the radio frequency and the multiplied wave nearest the radio frequency is selected. Then, the transmission power is increased in accordance with the amount of change in the transmission frequency so as to make the reception power by the mobile device 2 substantially equal before and after the change, and the process ends.

As described above, according to the vehicular power transmission device 10 of this embodiment, it is possible to easily and accurately eliminate noise mixing in the radio receiver 3 due to power transmission while preventing lowering of the reception power by the power reception mechanism 22 of the mobile device 2 due to change in the transmission frequency of the electromagnetic waves.

Of the two upward and downward changing frequencies, a changing frequency having a small change width is selected with respect to the first change instruction, and a changing frequency near the original transmission frequency is selected with respect to the second or subsequent change instruction. For this reason, it is possible to appropriately execute power transmission to the mobile device 2 while eliminating noise mixing in the radio receiver 3.

Even when the two upward and downward changing frequencies are not within the predetermined allowable frequency range, of the upper limit and the lower limit of the predetermined allowable frequency range, one having a large difference between the radio frequency and the multiplied wave nearest the radio frequency is selected. For this reason, it is possible to reduce radio noise within the allowable frequency range as much as possible.

In the foregoing embodiment, the power reception mechanism 22 of the mobile device 2 may include a sensor (detection unit) which detects the reception power of the electromagnetic waves.

In this case, the control unit 21 of the mobile device 2 may transmit the detection result of the reception power of the electromagnetic waves detected by the sensor of the power reception mechanism 22 to the vehicular power transmission device 10 by the communication unit 23.

The control unit 11 of the vehicular power transmission device 10 which acquires the detection result may change the transmission frequency of the electromagnetic waves based on the detection result.

The control unit 21 of the mobile device 2 may transmits a command signal instructing to change the transmission frequency of the electromagnetic waves to the vehicular power transmission device 10 by the communication unit 23 based on the detection result of the reception power of the electromagnetic waves detected by the sensor of the power reception mechanism 22.

The control unit 11 of the in-vehicle device 1 may further include an acquisition unit which acquires the reception power of the electromagnetic waves in the power reception mechanism 22. The control unit 11 may transmit a command signal instructing to change the transmission frequency of the electromagnetic waves to the power transmission mechanism 12 based on the reception power of the electromagnetic waves in the power reception mechanism 22 of the mobile device 2 acquired by the acquisition unit. The acquisition unit may be provided in the power transmission mechanism 12 (power transmission unit).

Although in the foregoing embodiment, of the two upward and downward changing frequencies, a changing frequency having a small change width is selected with respect to the first change instruction, and a changing frequency near the original transmission frequency is selected with respect to the second or subsequent change instruction, the invention is not limited thereto. For example, a changing frequency with a small change width may be selected with respect to the second or subsequent change instruction. For example, a changing frequency near a predetermined transmission frequency, such as an intermediate value within the predetermined allowable frequency range, may be selected regardless of the count of the change instruction.

In the foregoing embodiment, when the two upward and downward changing frequencies are not within the predetermined allowable frequency range, the effect may be notified to the operator.

Although in the foregoing embodiment, a case where the vehicular power transmission device 10 is provided in the in-vehicle device 1 has been described, the invention is not limited thereto. The vehicular power transmission device 10 may be provided in other various devices, and may be constituted as a single body along with the power transmission mechanism 12 and the communication unit 13.

It should be noted that the technical scope of the invention is not limited to the foregoing embodiment, and various modifications may be made to the foregoing embodiment within the scope without departing from the spirit of the invention. That is, the configuration of the foregoing embodiment is just an example, and may be appropriately modified.

What is claimed is:

1. A vehicular power transmission device comprising:
   a power transmission unit which is provided in a vehicle and transmits electromagnetic waves to a mobile device to transmit power to a power reception unit of the mobile device; and
   a frequency changing unit which, when it is determined based on a transmission frequency of the electromagnetic waves to be transmitted from the power transmission unit to the mobile device and a reception frequency of a radio receiver that radio noise is caused by the power transmission unit, changes the transmission frequency of the electromagnetic waves of the power transmission unit,
   wherein the power transmission unit changes a transmission power of the electromagnetic waves based on an amount of change in the transmission frequency of the electromagnetic waves changed by the frequency changing unit.

2. The vehicular power transmission device according to claim 1,
   wherein the power transmission unit increases the transmission power of the electromagnetic waves in accordance with the amount of change in the transmission frequency of the electromagnetic waves changed by the frequency changing unit.

3. The vehicular power transmission device according to claim 2,
   wherein the power transmission unit stores information regarding a transmission characteristic according to the transmission frequency of the electromagnetic waves in advance, and increases the transmission power of the electromagnetic waves so as to make reception power received by the power reception unit substantially equal before and after the change of the transmission frequency of the electromagnetic waves based on the information regarding the transmission characteristic and the amount of change in the transmission frequency of the electromagnetic waves.

4. The vehicular power transmission device according to claim 1, further comprising:
   an acquisition unit which acquires a reception power of the electromagnetic waves,
   wherein the power transmission unit changes the transmission power of the electromagnetic waves based on the reception power of the electromagnetic waves acquired by the acquisition unit.

5. The vehicular power transmission device according to claim 2, further comprising:
   an acquisition unit which acquires a reception power of the electromagnetic waves,
   wherein the power transmission unit changes the transmission power of the electromagnetic waves based on the reception power of the electromagnetic waves acquired by the acquisition unit.

6. The vehicular power transmission device according to claim 3, further comprising:
   an acquisition unit which acquires a reception power of the electromagnetic waves,
   wherein the power transmission unit changes the transmission power of the electromagnetic waves based on the reception power of the electromagnetic waves acquired by the acquisition unit.

* * * * *